United States Patent
Harvey et al.

(10) Patent No.: US 9,533,568 B1
(45) Date of Patent: Jan. 3, 2017

(54) METHOD AND APPARATUS FOR ANTI-SIPHONING OF FUEL

(71) Applicants: George Anthony Harvey, Port Orange, FL (US); Isaak Raage Jama, Daytona Beach, FL (US)

(72) Inventors: George Anthony Harvey, Port Orange, FL (US); Isaak Raage Jama, Daytona Beach, FL (US)

(73) Assignees: George Anthony Harvey, Port Orange, FL (US); Isaak Raage Jama, Daytona Beach, FL (US)

( * ) Notice: Subject to any disclaimer, the term of this patent is extended or adjusted under 35 U.S.C. 154(b) by 0 days.

(21) Appl. No.: 14/883,488

(22) Filed: Oct. 14, 2015

(51) Int. Cl.
*B60K 15/04* (2006.01)
*G07C 9/00* (2006.01)
*E05B 41/00* (2006.01)

(52) U.S. Cl.
CPC ....... *B60K 15/0403* (2013.01); *B60K 15/0409* (2013.01); *E05B 41/00* (2013.01); *G07C 9/00142* (2013.01); *G07C 9/00158* (2013.01); *B60K 2015/0416* (2013.01)

(58) Field of Classification Search
CPC .......... G06F 21/32; G06F 21/34; G06F 21/35; G06F 21/83; G06F 21/31; G06F 21/6245; G06F 2203/04106; G06F 2221/2153; G06F 3/04883
USPC .................................................. 340/5.53
See application file for complete search history.

(56) References Cited

U.S. PATENT DOCUMENTS

| | | | |
|---|---|---|---|
| 2007/0214849 A1* | 9/2007 | Yoshitake | B60R 25/04 70/278.3 |
| 2013/0125597 A1* | 5/2013 | Beaudoin | B60K 15/0409 70/237 |

* cited by examiner

*Primary Examiner* — Mark Blouin
(74) *Attorney, Agent, or Firm* — Isaak R. Jama

(57) ABSTRACT

An improved, secure, anti-siphoning method and apparatus that can be fitted into any size fuel tank. The present invention includes a re-configured fuel cap that includes an electronic display, a touchpad for numerically inputting a security code for allowing a user to unscrew the fuel cap. In addition, a biometric reader is implemented to read a user's thumb print, and subsequently allowing the user to access the fuel tank.

18 Claims, 6 Drawing Sheets

METHOD AND APPARATUS FOR ANTI-SIPHONING OF FUEL

FIELD OF INVENTION

This invention generally relates to preventing of fuel theft, and particularly to a method and apparatus for preventing siphoning of gasoline from a fuel tank of automobile, boats, motorcycles, trucks, and any other fuel tanks for internal combustion engines.

BACKGROUND OF THE INVENTION

Fuel tanks on vehicles and other motorized equipments, such as, motorcycles, farm equipments, tractor-trailers, boats, and personal aircrafts, generally has a fuel tank cover that can be easily opened, and a removable gas cap when filling the fuel tank. In certain instances, the fuel tank cover may be locked by closing it with a latch, or with a key. To access the fuel tank, it can be opened by pushing the cover in, using a key to unlock the cover, or by simply pulling the cover out. In later model vehicles, the fuel cover may be opened by raising a lever or pushing a button inside the vehicle, or in certain instances, the vehicle must first be unlocked, then the operator pushes on the cover to open it. For example, fuel thieves merely open the cover by simply pushing it in, and if the vehicle or the mechanized equipments is a late model that requires the gas cover to be opened from inside, thieves pry open the cover forcefully, and then siphoning the fuel.

With the increase in the prices of gasoline and other fuels, theft through siphoning has become a common problem for automobiles and other motorized equipments. Unattended vehicles and other mechanized equipments are vulnerable to fuel theft, where thieves simply push on the cover of the fuel tank, remove the fuel cap, and use a hose to siphon valuable and expensive fuel.

There are a myriad of attempts in circumventing fuel siphoning. U.S. Patent Application Publication Number 2012/0181275 (Bisaillon et al.) teaches an anti-siphoning device for fuel tanks, including an irremovable tubular body with an annular flange which is slidable into the neck of fuel tank for preventing insertion of a hose into the fuel tank. U.S. Patent Application Publication Number 2008/0156800 (Mougenot) teaches an antitheft and anti-overflow device for a fuel tank, including a plunger formed of a cylindrical retractable filling tube. U.S. Pat. No. 8,281,947 (Walkowski et al.) teaches an anti-siphon device, including among other pieces incorporated into the fuel tank, a check valve that allows fluid flow into the tank, and capable of blocking fluid flow out of the tank. The characteristics that all of the above-mentioned inventions share in common is that the fuel tanks have to be re-engineered and re-constructed, thus, increasing the cost of acquiring such a system Accordingly, there is a need for an ingenious, less-complicated and less-costly way of circumventing today's fuel theft problems.

SUMMARY OF THE INVENTION

The present invention provides an improved, secure, anti-siphoning method and apparatus that can be fitted into any size fuel tank. The present invention includes a re-configured fuel cap that includes an electronic display, a touchpad for numerically inputting a code for allowing the operator to unscrew the fuel cap.

Another objective of the present invention allows the operator to program the fuel cap with a biometric fingerprint reader for allowing only the owner of the finger print to access the fuel tank.

Another objective of the present invention includes an electronic control system which when the operator inputs the correct numerical code into the touch pad, or scans in the correct finger print, unlatches a metal latch which is designed to keep the fuel cap from being un-corked.

While the novel features of the invention are set forth with, particularly in the appended claims, the invention, both as to its utility and ease of use, will be better understood and appreciated, along with other objects and features thereof, from the following detailed description and accompanying drawings.

BRIEF DESCRIPTION OF THE DRAWINGS

The present invention will be become more fully understood from the detailed description and accompanying drawings, wherein.

DETAILED DESCRIPTION OF THE INVENTION

The following description is intended to convey an understanding of the invention by providing a number of specific embodiments and details involving various applications of the invention. It is understood, however, that the invention is not limited to these embodiments and details, which are only exemplary. It is further understood that one possessing ordinary skill in the art, in light of known apparatuses and methods, would appreciate the use of the invention for its intended purposes and benefits in any number of alternative embodiments, depending upon specific design and other needs.

Figure 1:
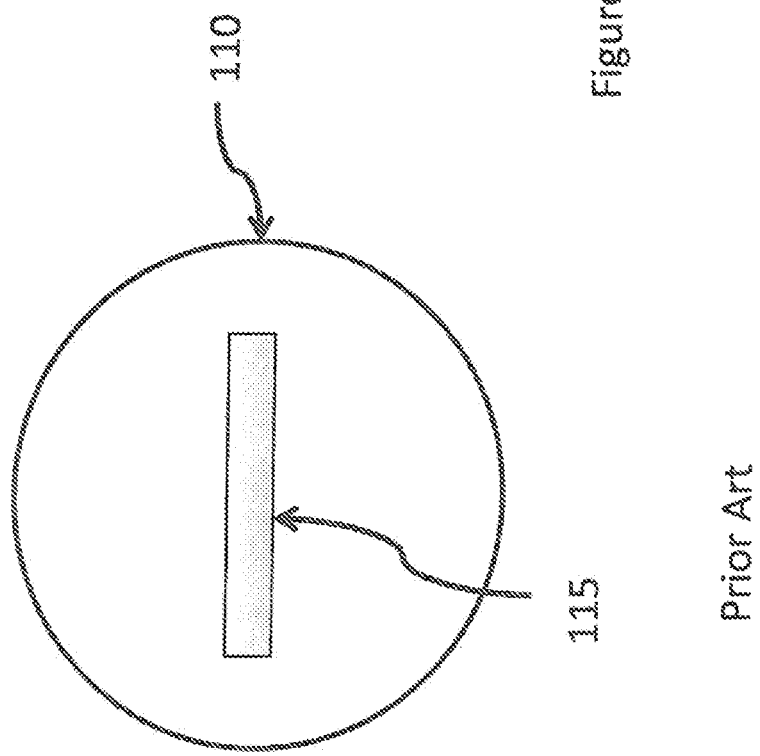
FIG. 1 is a prior art fuel tank cap normally found in vehicles and other mechanized equipments.

Referring to FIG. 1, there is shown a front view of a prior art fuel tank cap 110 (which may be inter-changeably referred to as a gas cap). As can be seen from the figure, the front part includes a raised middle section 115 that aids in getting a leverage to open or close the gas cap.

Figure 2:
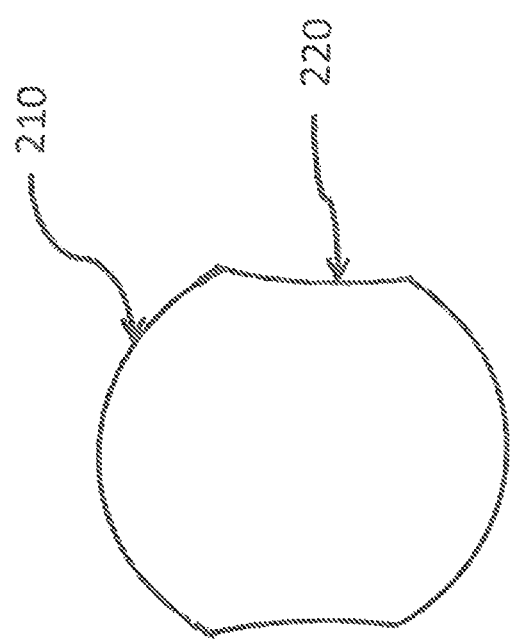
FIG. 2 is an improved fuel tank cap according to an embodiment of the present invention.

In one embodiment of the present invention, and referring to FIG. 2, there is shown an improved gas cap 210. The improved gas cap 210 comprises curved sides 220 for facilitating leverage in opening or closing a fuel tank; the improved gas cap 210 with the curved sides design 220, allows the area covered by the face of the gas cap 210 which is made of plastic to be utilized for other purposes, including incorporation of access control (explained in the ensuing paragraphs) that grants access to a fuel tank to only those users that are allowed access.

Figure 3:
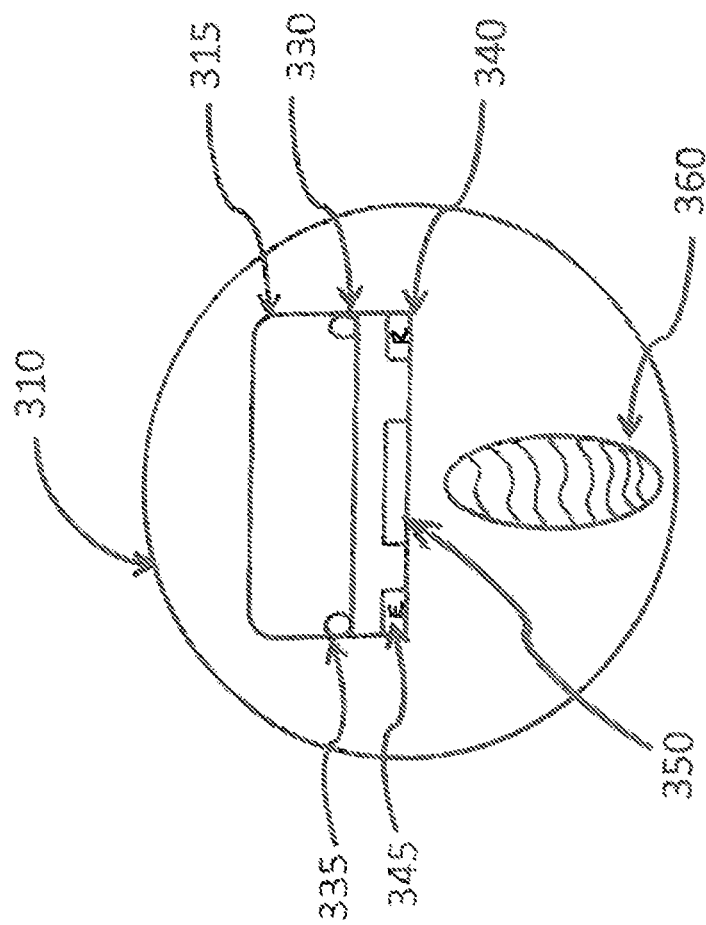
FIG. 3 is a fuel tank cap including a touchpad screen and a biometric finger print reader according to an embodiment of the present invention.

In another embodiment and in reference to FIG. 3, the improved gas cap 310, allows incorporation of an electronic display 315 for displaying inputted four-digit code by a user and including a touch-screen keypad 325, a "Set" button 350 for pressing to set the initially inputted four-digit code of the user, a green LED 330, for indicating to the user that the inputted four-digit code is the correct code, and a red LED 335, for indicating to the user that the inputted four-digit code is an incorrect code. The display 315 also includes an enter "E" button 345, for pressing when the user inputs a code, and a reset "R" button 340, for resetting the display 315 to accept a newly entered four-digit code. Furthermore, the improved gas cap 310, includes a biometric reader 360, for initially reading a thumb print of the user, and subsequently reading the thumb print of the user for verifying whether the thumb print is that of the user or not, and display 325 for displaying information that the thumb print is the correct thumb print, and at the same time lighting up a green LED 330, to indicate that the thumb print is the correct one, and lighting a red LED 335, to indicate that the thumb print is an incorrect thumb print. In order to allow access to more than one individual of a family, or employees of a company that may use any motorized equipment that incorporates the gas cap of the present invention, each individual may initially record their thumb print, and/or create a four-digit access code. Additionally, and in the event the motorized equipment that has the improved gas cap of the present invention, is transferred to another owner through a sale, or gifted to another, the saved four-digit, and the recorded thumb print may be erased by holding the reset "R" button 340 of FIG. 3 for 10 seconds, and then they may input a four-digit code given by a controlling entity such as, for example, a manufacturer of the motorized equipment, or a security company that may control access. Afterwards, the new owners of the motorized equipment may set their own four-digit code, and/or record their thumb print.

Figure 4:
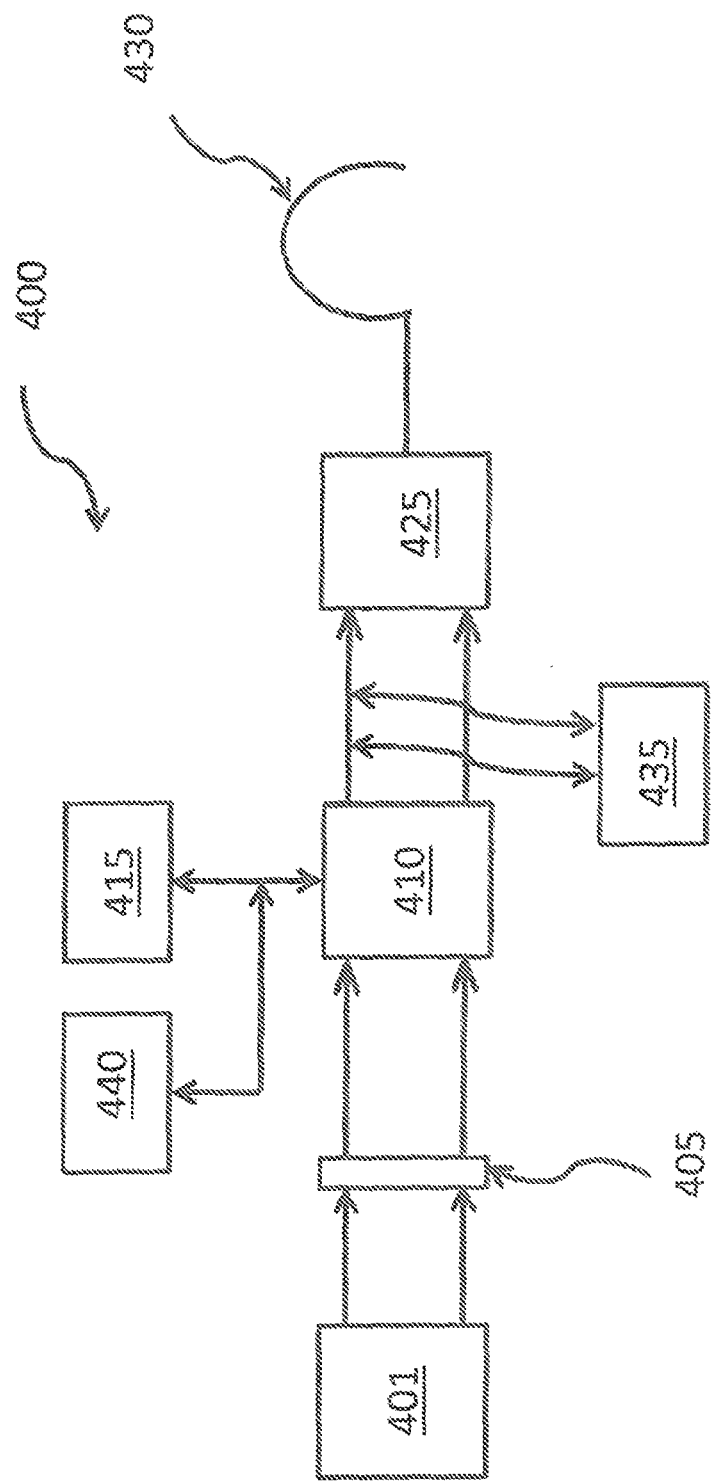
FIG. 4 is a schematic diagram of an electronic module for controlling access to the fuel tank cap, according to an embodiment of the present invention.

Referring to FIG. 4, the present invention includes a controller 400, for controlling access to the fuel tank. Controller 400, includes a power source 401, such power source is from the electrical harness of a motorized equipment (such as cars, trucks, motorcycles, boats, personal airplanes, etc.), via connection 405. An electronic access module 410, controls access of users to the fuel tank by receiving a four-digit code from keypad 415, or a thumb print from finger print reader 440, transmit the received data (four-digit code or thumb print) to a memory module 420, where the original four-digit code and the original thumb print of the user are stored. If the correct four-digit code and the original thumb print returned from the memory module 420, a green LED comes on at indicator light 435, indicating that the inputted data is correct. If the four-digit code and the original thumb print returned from the memory module 420 is incorrect, a red LED comes on at indicator light 435, indicating that the inputted data is incorrect. Once the green LED comes on and the inputted data is verified to be authentic, the electronic control module 410 transmits a signal to a solenoid 425, which in turn activates a latch 430. The latch 430 locks onto a threaded portion (not shown) of the gas cap when activated and in a lock mode. Once the correct four-digit code and the original thumb print is verified, and a deactivated signal is transmitted to the solenoid 425, the solenoid 425 transmits a deactivate signal to the latch 430 to remove it from the threaded portion of the gas cap.

Figure 5:
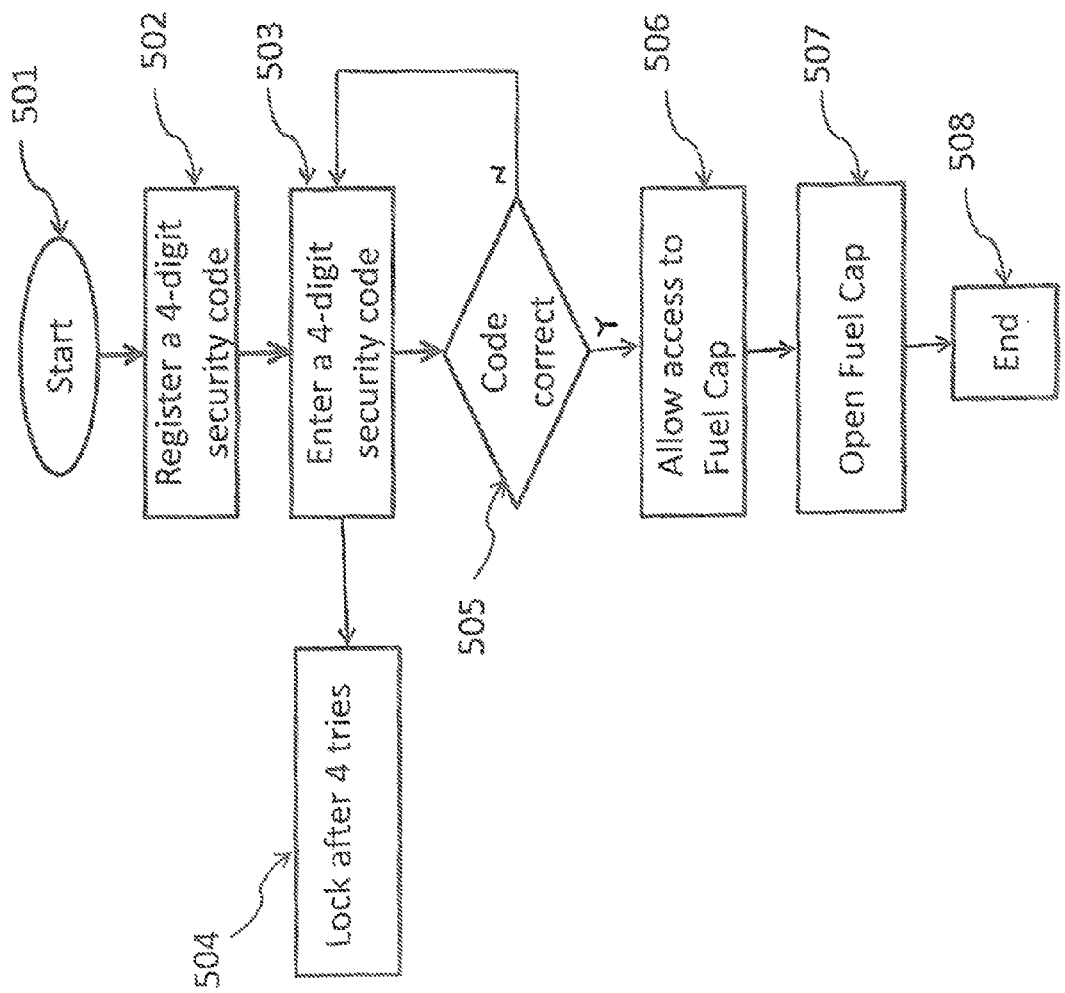
FIG. 5 is flow chart illustrating method steps for accessing the fuel tank cap by inputting a numerical code, according to an embodiment of the present invention.

Referring now to FIG. 5, the user begins the process at step 501, moves on to step 502, by registering a four-digit security code. Then when the user subsequently intends to access the gas tank, the user enters a four-digit security code in step 503, when the controller of FIG. 4 ascertains that the inputted four-digit security code is the correct one in step 505, the user is allowed access to the gas cap in step 506, and may open the gas cap in step 507. When the controller of FIG. 4 ascertains that the inputted four-digit security code is an incorrect one in step 505, the system is reset to allow the user to once again attempt to input the correct four-digit security code. If the user inputs the correct four-digit security code in step 503, during an ensuing attempt, the user is allowed access to the gas cap in step 506, and may open the gas cap in step 507. The system gives user four successive tries to input the correct four-digit security code, and if the user fails to supply the correct four-digit security code, the system locks the user out.

Figure 6:
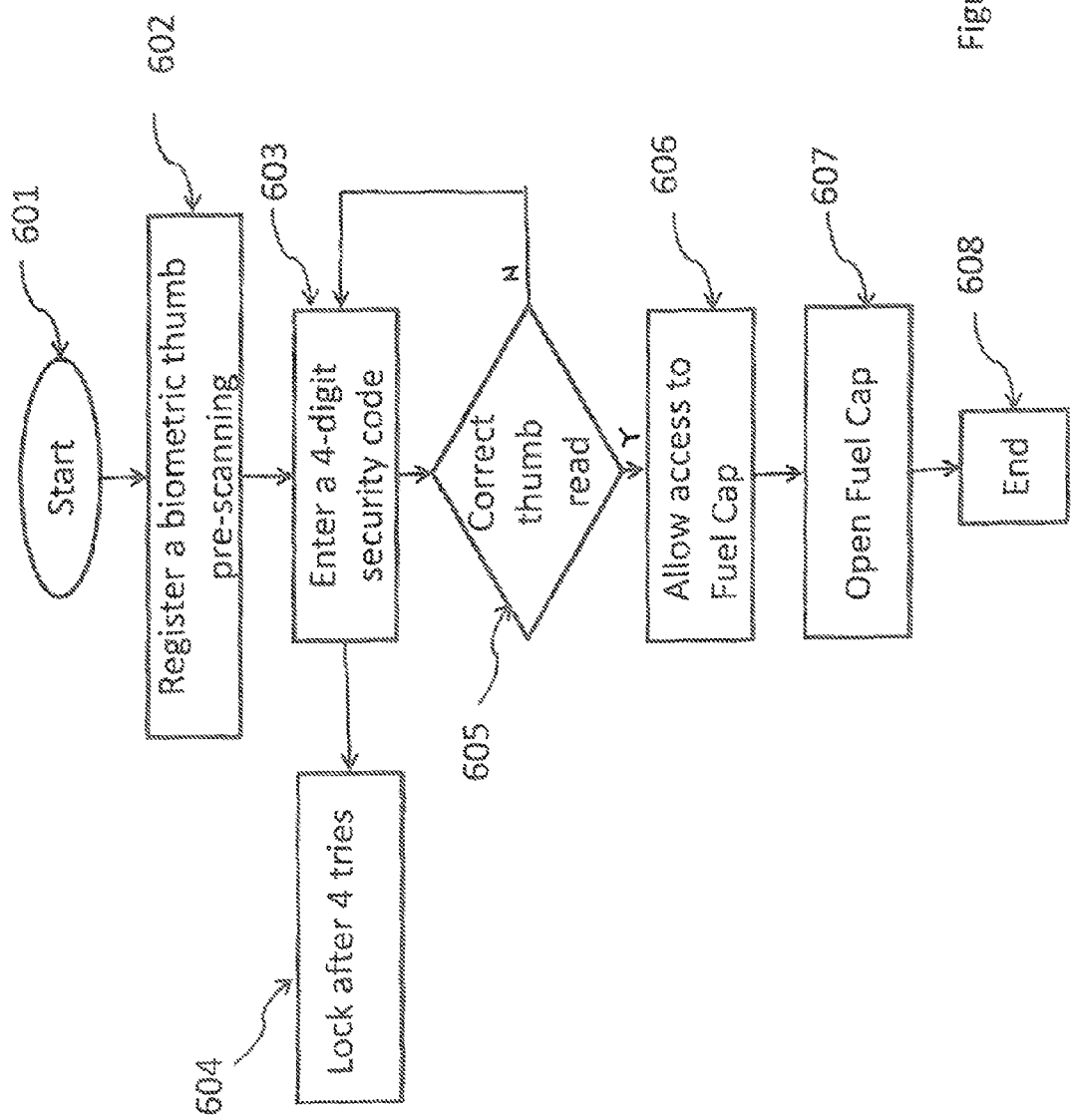
FIG. 6 is a flow chart illustrating method steps for accessing the fuel tank cap by a biometric reader, according to an embodiment of the present invention.

Referring to FIG. 6, the user begins the process at step 601, moves on to step 602, by registering a biometric thumb scan. Then when the user subsequently intends to access the gas tank, the user lays an original thumb print 603 on a biometric reader, when the controller of FIG. 4 ascertains that the biometrically read thumb print is the correct one in step 605, the user is allowed access to the gas cap in step 606, and may open the gas cap in step 607. When the controller of FIG. 4 ascertains that the biometrically read thumb print is an incorrect one in step 605, the system is reset to allow the user to once again attempt to input the correct biometrically read thumb print. If the user inputs the correct biometrically read thumb print in step 603, during an ensuing attempt, the user is allowed access to the gas cap in step 606, and may open the gas cap in step 607. The system gives user four successive tries to input the correct biometrically read thumb print, and if the user fails to supply the correct biometrically read thumb print, the system locks the user out.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A fuel anti-theft device comprising:
a fuel tank cap having curved sides, and electronic unit;
the electronic unit further comprising:
an electrical power source for powering the electronic unit;
a keypad for allowing a user to initially input a security code;
a biometric reader for recording a thumb print of the user;

a memory module for storing said security code inputted by the user, as well as said thumb print recorded by the user;

an electronic access module that transmits the inputted security code or the read thumb print to the memory module for verification;

a green indicator light for indicating that the correct security code is inputted, and that the correct thumb print is scanned, and a red indicator light for indicating that an incorrect security code is inputted and that an incorrect thumb print is scanned;

a solenoid for receiving an activation signal from the electronic access module; and a latch that moves from a closed position to an open position, when activated by said solenoid.

2. The fuel anti-theft device of claim 1, wherein the security code comprises a four-digit numerical code.

3. The fuel anti-theft device of claim 1, wherein the keypad is configured to allow the user to input the initially inputted security code.

4. The fuel anti-theft device of claim 1, wherein the biometric reader reads the user's thumb print, to be compared to the earlier recorded thumb print.

5. The fuel anti-theft device of claim 1, wherein the electronic unit is further configured to accept more than one security code, and more than one thumb print.

6. The electronic unit of claim 1, further including a memory module for saving inputted security codes, and thumb print of the user.

7. The electronic unit of claim 1, further including a reset button for erasing the inputted four-digit codes and the recorded thumb prints, and allowing a new set of four-digit codes to be inputted, and a new set of thumb prints to be recorded.

8. The electronic unit of claim 1, further including a solenoid when energized, activates a latch.

9. The electronic unit of claim 8, further including the latch moving from a threaded back portion of the fuel tank cap.

10. A fuel anti-theft method comprising:

using a fuel tank cap having curved sides, and an electronic unit;

powering the electronic unit using an electrical power source;

allowing a user to initially input a security code using a keypad;

recording a thumb print of the user using a biometric reader;

storing said security code inputted by the user, as well as said thumb print recorded by the user in a local memory module;

inputting a security code and a thumb print for accessing the fuel tank;

transmitting the inputted security code and the read thumb print to the memory module for verification;

illuminating a green indicator light for indicating that the correct security code is inputted and that the correct thumb print is read, and illuminating a red indicator light for indicating that an incorrect security code is inputted and that an incorrect thumb print is scanned;

transmitting an activation signal from the electronic access module to a solenoid; and moving a latch from a closed position to an open position, when activated by said solenoid.

11. The fuel anti-theft method of claim 10, wherein the security code comprises a four-digit numerical code.

12. The fuel anti-theft method of claim 10, wherein the keypad is configured to allow the user to input the initially inputted security code.

13. The fuel anti-theft method of claim 10, wherein the biometric reader reads the user's thumb print, to be compared to the earlier recorded thumb print.

14. The fuel anti-theft method of claim 10, wherein the electronic unit is further configured to accept more than one security code, and more than one thumb print.

15. The fuel anti-theft method of claim 10, further including saving inputted four-digit security codes, and thumb prints of the users.

16. The fuel anti-theft method of claim 10, further including energizing a solenoid for activating a latch.

17. The fuel anti-theft method of claim 10, further including moving the latch from a threaded back portion of the fuel tank cap.

18. The fuel anti-theft method of claim 10, further including erasing the inputted four-digit codes and the recorded thumb prints, and allowing a new set of four-digit codes to be inputted, and a new set of thumb prints to be recorded.

* * * * *